United States Patent
Anderson et al.

(10) Patent No.: US 10,346,625 B2
(45) Date of Patent: Jul. 9, 2019

(54) AUTOMATED MECHANISM TO ANALYZE ELEVATED AUTHORITY USAGE AND CAPABILITY

(71) Applicant: International Business Machines Corporation, Armonk, NY (US)

(72) Inventors: Mark J. Anderson, Oronoco, MN (US); Carol S. Budnik, Rochester, MN (US); Anna P. Dietenberger, Rochester, MN (US); Scott Forstie, Rochester, MN (US); Brian J. Hasselbeck, Rochester, MN (US); Allen K. Mei, Rochester, MN (US); Ellen B. Streifel, Rochester, MN (US); Jeffrey M. Uehling, Saint Charles, MO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/339,675

(22) Filed: Oct. 31, 2016

(65) Prior Publication Data

US 2018/0121665 A1     May 3, 2018

(51) Int. Cl.
    *G06F 21/62*      (2013.01)

(52) U.S. Cl.
    CPC .............................. *G06F 21/6209* (2013.01)

(58) Field of Classification Search
    CPC .................................................. G06F 21/6209
    See application file for complete search history.

(56) References Cited

U.S. PATENT DOCUMENTS

| | | | |
|---|---|---|---|
| 6,138,238 A | 10/2000 | Scheifler et al. | |
| 6,233,576 B1 | 5/2001 | Lewis | |
| 6,711,687 B1 | 3/2004 | Sekiguchi | |
| 6,904,513 B1 * | 6/2005 | Tormey | G06F 7/785 |
| | | | 712/202 |

(Continued)

FOREIGN PATENT DOCUMENTS

WO     2015038944 A1     3/2015

OTHER PUBLICATIONS

Windows Security Log Event ID 4672—Special privileges assigned to new logon, https://www.ultimatewindowssecurity.com/securitylog/encyclopedia/event.aspx?eventID=4672, pp. 1-2.

(Continued)

*Primary Examiner* — Yin Chen Shaw
*Assistant Examiner* — Richard W Cruz-Franqui
(74) *Attorney, Agent, or Firm* — Patterson + Sheridan, LLP

(57) ABSTRACT

Systems, methods, and computer program products to perform an operation comprising monitoring a set of file access requests to a file from an application to obtain permission and identity information related to the monitored requests, wherein the monitoring includes obtaining a runtime stack from the application, determining, based on environment information in the runtime stack, whether a first set of privileges available to the application are greater than a second set of privileges available to a the user of the application, storing the permission and identity information and an indication of whether the first set of privileges is greater than the second set of privileges in a data file, and adjusting the privileges for the user based on the determination.

20 Claims, 10 Drawing Sheets

(56) References Cited

U.S. PATENT DOCUMENTS

| | | | |
|---|---|---|---|
| 8,271,780 B2 | 9/2012 | Xiao et al. | |
| 8,413,247 B2 | 4/2013 | Hudis et al. | |
| 8,677,501 B2 | 3/2014 | Fujishima et al. | |
| 9,152,778 B2* | 10/2015 | Perlman | G06F 21/50 |
| 9,674,194 B1* | 6/2017 | McClintock | H04L 63/10 |
| 2002/0120919 A1* | 8/2002 | Aizenbud-Reshef | G06F 8/34 717/127 |
| 2003/0159069 A1 | 8/2003 | Choi et al. | |
| 2004/0181788 A1 | 9/2004 | Kester et al. | |
| 2005/0044399 A1 | 2/2005 | Dorey | |
| 2005/0108206 A1* | 5/2005 | Lam | G06F 16/188 |
| 2005/0223220 A1* | 10/2005 | Campbell | G06F 9/45537 713/164 |
| 2006/0037082 A1* | 2/2006 | LaMacchia | G06F 21/52 726/27 |
| 2007/0029358 A1 | 2/2007 | Jacobs | |
| 2007/0079358 A1 | 4/2007 | Lambert et al. | |
| 2008/0244694 A1 | 10/2008 | Neystadt et al. | |
| 2008/0288926 A1* | 11/2008 | Cain, III | G06F 11/3466 717/128 |
| 2009/0064218 A1 | 3/2009 | Yamagishi | |
| 2009/0282457 A1* | 11/2009 | Govindavajhala | G06F 21/577 726/1 |
| 2009/0300532 A1 | 12/2009 | Cowan | |
| 2010/0017742 A1* | 1/2010 | Rhodes | G06F 3/0482 715/780 |
| 2010/0023522 A1* | 1/2010 | Madathilparambil George | G06F 16/10 707/E17.005 |
| 2010/0223570 A1 | 9/2010 | Gerstl et al. | |
| 2011/0153560 A1* | 6/2011 | Bryant | G06F 16/182 707/610 |
| 2012/0198569 A1 | 8/2012 | Halas | |
| 2012/0233216 A1* | 9/2012 | Lim | G06F 21/6227 707/781 |
| 2012/0254946 A1* | 10/2012 | Fleischman | H04L 63/0823 726/4 |
| 2012/0294146 A1 | 11/2012 | Wu | |
| 2013/0111167 A1* | 5/2013 | Lih | G06F 12/1009 711/162 |
| 2014/0096245 A1* | 4/2014 | Fischer | G06F 21/52 726/23 |
| 2015/0248341 A1* | 9/2015 | Cabrera | G06F 11/07 714/37 |
| 2015/0379290 A1* | 12/2015 | Shinke | G06F 8/70 726/28 |
| 2016/0062817 A1 | 3/2016 | Young et al. | |
| 2016/0065554 A1* | 3/2016 | Brown | G06F 21/629 726/1 |
| 2016/0350019 A1* | 12/2016 | Koufaty | G06F 3/0622 |
| 2016/0357958 A1* | 12/2016 | Guidry | G06F 21/53 |
| 2017/0111368 A1* | 4/2017 | Hibbert | H04L 63/062 |
| 2017/0177368 A1* | 6/2017 | DeHon | G06F 9/30101 |
| 2017/0180403 A1* | 6/2017 | Mehta | H04L 63/1416 |
| 2017/0359284 A1* | 12/2017 | Sudduth | H04L 51/063 |

OTHER PUBLICATIONS

NixCraft, Linux audit files to see who made changes to a file, http://www.cyberciti.biz/tips/linux-audit-files-to-see-who-made-changes-to-a-file.html, pp. 1-26.
Psutil 5.0.0: Python Package Index, https://pypi.python.org/pypi/psutil, pp. 1-5.
Linux Security HOWTO, Files and File System Security, http://www.tldp.org/HOWTO/Security-HOWTO/file-security.html, pp. 1-7.
OWASP, Logging Cheat Sheet, https://www.owasp.org/index.php/Logging_Cheat_Sheet, Jan. 20, 2016, pp. 1-12.
SANS Institute InfoSec Reading Room, Detecting Security Incidents Using Windows Workstation Event Logs, https://www.sans.org/reading-room/whitepapers/logging/detecting-security-incidents-windows-workstation-event-logs-34262, pp. 1-35.
SELinux/Quick Instruction—Gentoo Wiki, https://wiki.gentoo.org/wiki/SELinux/Quick_introduction, pp. 1-15.
SELinux/Tutorials/Where to find SELinux permission denial details—Gentoo Wiki, https://wiki.gentoo.org/wiki/SELinux/Tutorials/Where_to_find_SELinux_permission_denial_details, pp. 1-10.
Re: User file access auditing, http://www.redhat.com/archives/fedora-selinux-list/2004-October/msg00125.html, pp. 1-2.
Security log—Wikipedia, https://en.wikipedia.org/wiki/Security_log, p. 1.
List of IBM Patents or Patent Applications Treated As Related.
Axelsson et al. "Approach to UNIX security logging." Published in Proccedings of the 21st National Information Systems Security Conference, pp. 62-75, Oct. 5-8, Crystal City, Arlington, VA, USA, 1998 (Related).
Singh, "An experiment in software component retrieval based on metadata and ontology repository." International Journal of Computer Applications 61.14 (2013). (Background).
Bhagat et al., "An Analysis on Cloud Data Security and Accountability." International Journal of Current Engineering and Technology 1.4 (2014): 2464-2467. (Background).
Gaifang, "The Development of Logging Large-scale Management Information System" Challenges in Environmental Science and Computer Engineering (CESCE), 2010 International Conference on. vol. 2. IEEE, 2010. (Related).
Linux Security HOWTO, "Files and File System Security," [Available Online], http://www.tldp.org/HOWTO/Security-HOWTO/file-security.html, [Accessed on Mar. 15, 2017], pp. 1-7.
U.S. Appl. No. 15/339,675, entitled "Automated Mechanism to Analyze Elevated Authority Usage and Capability," filed Oct. 31, 2016.
ultimatewindowssecurity.com, "Special Priviledges Assigned to New Logon," [Available Online], detecting security incidents using windows workstation event logs, pp. 1-2 [Accessed Mar. 15, 2017].
Python, "Psutil 5.2.0: Phyton Package Index," [Available Online], https://pypi.python.org/pypi/psutil, pp. 1-5 [Accessed Mar. 15, 2017].
Smalley, "Re: User File Access Auditing," Oct. 22, 2004, [Available Online] http://www.redhat.com/archives/fedora-selinux-list/2004-October/msg00125.html [Accessed on Mar. 15, 2017].
SANS Institute InfoSec Reading Room, "Detecting Security Incidents Using Windows Workstation Event Logs," Accepted Jun. 19, 2013, pp. 1-35.
wikipedia.org, "Security Log," [Available Online] [Page modified on Jun. 29, 2016] https://en.wikipedia.org/wiki/Security_log, pp. 1 [Accessed on Mar. 15, 2017].
Gentoo linus, "SELinux/Quick introduction," [Available Online] [Page Modified on Jan. 13, 2015], https://wiki.gentoo.org/wiki/SELinux/Quick_introduction [Accessed on Mar. 15, 2017] pp. 1-15.
Singh, "An experiement in software component retrieval based on metadata and ontology repository," International Journal of Computer Applications 61.14 (2013). (Background).
Gite, Linux Audit Files to see who made changes to a file, Bitbucket, Jun. 21, 2016, pp. 1-22.
SELinux/Tutorials/Whre to find SELinux permission denial details—Gentoo Wiki, https://wiki.gentoo.org/wiki/SELinux/Tutorials/Where_to_find_SELinux_Permission_denial_details, pp. 1-10.
Developers, "Requesting Permissions at Run Time," [Available Online] https://developer.android.com/training/permissions/requesting.html, [Accessed Mar. 15, 2017], pp. 1-5.
Chalmers Univieristy of Technology, "Log-Based Anomaly Detection for System Surveillance," Cecilia Geijer and Josefina Anderson, 2015, pp. 1-71.
"Windows Incident Response" [Available Online] http://windowsir.blogspot.com/2013/07/howto-determine-user-access-to-files.html, Jul. 8, 2013, [Accessed Mar. 15, 2017] pp. 1-5.
SearchSecurity, "An Inside Look at Security Log Management Forensics Investigations," [Available Online], http://searchsecurity.techtarget.com/tip/An-inside-look-at-security-log-management-forensics-investigations, [Accessed on Mar. 15, 2017] pp. 1-12.
Logentires.com "Automated Anomaly Detection," [Available Online], https://logentries.com/product/anomaly-detection/ [Accessed on Mar. 15, 2017] pp. 1-3.

(56) References Cited

OTHER PUBLICATIONS

U.S. Appl. No. 15/339,664 entitled "Automated Mechanism to Obtain Detailed Forensic Analysis of File Access," filed Oct. 31, 2016.

\* cited by examiner

| 402 AUTH.. | 404 TIMESTAMP | 406 SYSTEM_OBJ | 408 REQ_AUT | 410 DETAILED_REQ_AUT | 412 CUR_AUT | 414 AUT_SRC |
|---|---|---|---|---|---|---|
| FRED1 | 3/7/16 12:48 | FILEA | READ | READ WRITE EXECUTE | EXECUTE | PUBLIC |
| FRED1 | 3/7/16 12:49 | FILEB | READ EXECUTE | READ WRITE EXECUTE | WRITE | PUBLIC |
| FRED1 | 3/7/16 12:50 | FILEB | - | READ EXECUTE | WRITE | PUBLIC |
| FRED1 | 3/7/16 12:51 | CALL | READ EXECUTE | READ EXECUTE | EXECUTE | PUBLIC |
| FRED1 | 3/7/16 12:52 | FILEX | - | READ EXECUTE | WRITE | USER PRIVATE |
| FRED1 | 3/7/16 12:53 | FILEX | - | READ EXECUTE | WRITE | USER PRIVATE |
| FRED1 | 3/7/16 12:54 | FILEX | WRITE | READ EXECUTE DELETE | WRITE | PUBLIC |
| FRED1 | 3/7/16 12:55 | FILE3 | WRITE | READ EXECUTE DELETE | WRITE | PUBLIC |
| FRED1 | 3/7/16 12:56 | FILE4 | - | EXECUTE | WRITE | PUBLIC |

400

| 416 ELV_AUT | 418 PGM_INVOKED | 420 PGM_ST_NUM | 422 ELV_PGM_NA | 424 ELV_PGM_ST_NUM | 426 ELV_PROG_OWN |
|---|---|---|---|---|---|
| 0 | PROGRAM1 | 12 | PGMNAME | - | FRED2 |
| 0 | PROGRAM2 | 11 | - | - | - |
| 0 | PROGRAM3 | 4 | PGMNAME | - | FRED2 |
| 0 | PROGRAM1 | 11 | - | - | - |
| 0 | PROGRAM4 | 12 | PGMNAME | - | FRED2 |
| 0 | PROGRAM5 | 12 | PGMNAME | - | FRED2 |
| 1 | PROGRAM6 | 12 | PGMNAME | 12 | FRED2 |
| 1 | PROGRAM6 | 12 | PGMNAME | 12 | FRED2 |
| 0 | PROGRAM6 | 12 | PGMNAME | - | FRED2 |

FIGURE 4

AUTOMATED MECHANISM TO ANALYZE ELEVATED AUTHORITY USAGE AND CAPABILITY

BACKGROUND

The present disclosure relates to an automated mechanism to analyze elevated authority usage and capability, and more specifically, to detect whether elevated authority is available or used and determine the relationship between privileges of the elevated authority and privileges of other available authority.

Generally people and organizations rely on multiple software applications. Each user generally has a set of permissions which specifies what files or data the user may be able to access. These permissions may be file specific, allowing the user to access each file in a certain way, such as read only, read and write, or otherwise access the file. Often, a set of permissions are configured per user for sets of files, for example at a directory level. In such cases, a user may have a certain level of access to one set of files in a particular directory, such as their personal directory, and another level of access to another directory, such as a network share.

Users typically use multiple applications, which may be stored in a common storage partition. These applications may be configured, for example either by automatically during setup or by an administrator, with generous permissions levels, creating a security risk. Generally there is very little or no detailed knowledge by application administrators of the exact permissions required by individual users to access specific files for use with an application. Rather, administrators generally configure permissions by, for example, directory levels, or broadly for sets of users. However, configuring permissions using broad settings can present an unnecessary security risk as excessive permissions may allow for an attacker to more easily access and exfiltrate data. Additionally, elevated privileges may be available to certain applications, which may or may not be used to access files. What is needed is a mechanism by which to automatically detect whether elevated privileges are available, whether those elevated privileges are used and configure permissions appropriately, based on the availability of elevated privileges, while preserving application functionality and reducing excessive permissions.

SUMMARY

According to one embodiment of the present disclosure, a method for securing file access. Generally, the method comprises monitoring a set of file access requests to a file from an application to obtain permission and identity information related to the monitored requests, wherein the monitoring includes obtaining a runtime stack from the application, determining, based on environment information in the runtime stack, whether a first set of privileges available to the application are greater than a second set of privileges available to a the user of the application, storing the permission and identity information and an indication of whether the first set of privileges is greater than the second set of privileges in a data file, and adjusting the privileges for the user based on the determination.

According to another embodiment of the present disclosure, a system for securing file access. Generally, the system comprises a processor and a memory including a program which when executed by the processor, performs an operation comprising monitoring a set of file access requests to a file from an application to obtain permission and identity information related to the monitored requests, wherein the monitoring includes obtaining a runtime stack from the application, determining, based on environment information in the runtime stack, whether a first set of privileges available to the application are greater than a second set of privileges available to a the user of the application, storing the permission and identity information and an indication of whether the first set of privileges is greater than the second set of privileges in a data file, and adjusting the privileges for the user based on the determination.

According to another embodiment of the present disclosure, a computer program product comprising a computer-readable storage medium having computer-readable program code embodied therewith, the computer-readable program code executable by one or more computer processors for securing file access. The computer-readable program code comprises computer-readable program code for monitoring a set of file access requests to a file from an application to obtain permission and identity information related to the monitored requests, wherein the monitoring includes obtaining a runtime stack from the application, determining, based on environment information in the runtime stack, whether a first set of privileges available to the application are greater than a second set of privileges available to a the user of the application, storing the permission and identity information and an indication of whether the first set of privileges is greater than the second set of privileges in a data file, and adjusting the privileges for the user based on the determination.

BRIEF DESCRIPTION OF THE SEVERAL VIEWS OF THE DRAWINGS

FIG. 4 is a chart view of the file permissions check log, in accordance with aspects of the present disclosure.

DETAILED DESCRIPTION

Embodiments disclosed herein are directed to an automated mechanism to secure customer data. Generally, permission levels for file access should be set to the lowest level possible that still enables applications and/or users to properly use the file. For example, an application may be set up with configuration files in a user directory such that the application has read, write, execute, and delete access to the file. These permissions may be derived by the user's level of permissions or the application's. Generally, an application's level of permissions is derived from the authority of the user which executes the application, although mechanisms exist for applications to execute using elevated privileges. In the case where the application only requires read access to a file, but has read/write access to the file, the application has unnecessary permissions. Analysis of whether an application has access to appropriate privileges may also take into consideration whether elevated privileges are available and whether those elevated privileges are used. For example, where elevated privileges are available, sufficient to grant a necessary level of access to a file, and not used, user level privileges to the file may be removed. These unnecessary permissions expose users to security issues in an event the application or computer system is compromised.

Figure 1:
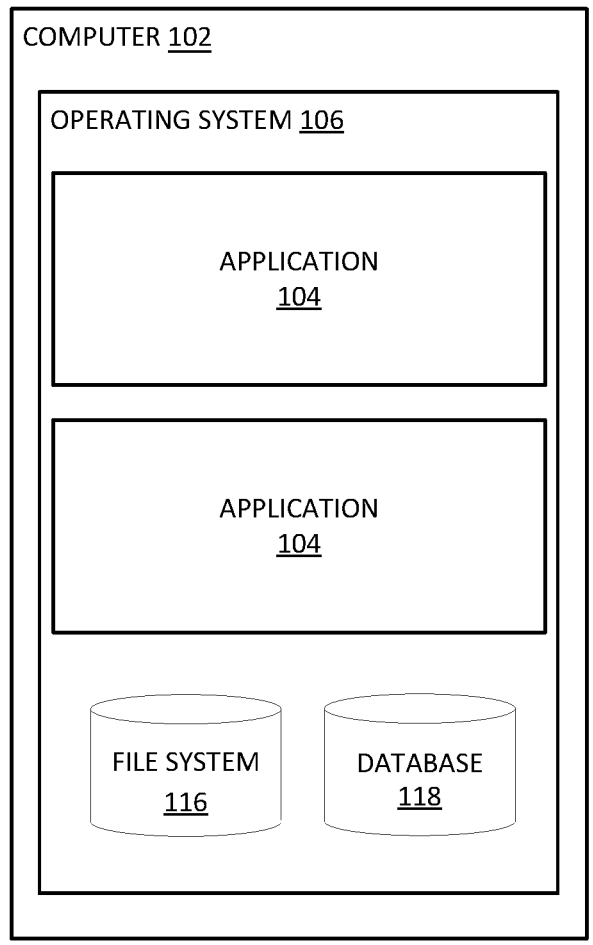
FIG. 1 illustrates an example computing environment, in accordance with aspects of the present disclosure.

FIG. 1 illustrates an example computing environment, in accordance with aspects of the present disclosure. As illustrated in FIG. 1, multiple applications 104 may execute on a computer 102. These applications may run in an operating system 106, which may itself run in a virtual machine on a host operating system (not shown). These applications 104 may access files stored in the shared location, such as a file system 106 of the operating system 106, a database 108, or other mechanism for file storage and access.

As a part of obtaining detailed information regarding an application in issuing a request for access, detailed information about what level of permissions necessary for an application to work properly may be gathered. For example, in many operating systems, each file and directory has a set of permissions such as read, write, and execute permissions. Each file and directory is associated with a set of user-based permissions which control what permissions a particular user, or group of users, or applications have such that, for example, a particular user may have read-only permissions on one file and read/write permissions on another file.

An installed application, such as application 104A, has files not only in a dedicated directory, but may also have files in system, shared, or user directories scattered throughout a file system. The application may also install, by default, with a level of permissions higher than needed to access these files and run the application. For example, an application may be installed with read/write access to application program files, as the program files are located in a directory where the user has read/write access to, while the application only needs to read from the program files in the course of running the application. In such a case, as the user only needs read only access to the file but has read/write access, the user has excessive permissions to the file. In an enterprise setting, unnecessary security vulnerabilities may occur unless an administrator adjusts permissions.

In addition to program files, a user may access various files. Each file is associated with a set of permissions defining how users may access the file and these permissions may be derived or changed at run time. For example, a user may have read only permissions to a set of files, where file access permission levels for the files are set based on user-level, group-level, or other level of permission settings. An application, executing in the context of the user, may derive permissions from the user-level permissions and use those permissions to open a file of the set of files for read access. In another example, where the user again has read only permissions to a set of files, the application may need read/write access to a file. As the user only has read access to the file, the user does not have that authority. However, the application may be able to elevate its authority, i.e., the application may be able to assert another set of permissions other than those permission derived from the user's permissions. For example, the setuid utility in Linux, allows an application to assert the authority of the owner of the application rather than the user. By asserting the authority of an entity other than the user, the application may be able to access files that the user otherwise would not be able to access. Using this elevated authority, the application is able to open the file for read/write access even though the user does not have read/write permissions on the file.

As such, it can be very difficult for the customer or administrator to determine a minimum set of permissions needed for each file as even if the administrator can readily identify what files or directories need to have the appropriate permissions set, the administrator cannot assume that the user actually needs, for example, read/write permissions to a file as the user may be able to access the file via an application executing with elevated privileges. Where the user is able to gain read/write access to the file with the corresponding application, then the user's permissions should not be set to read/write absent a need to access the file outside of the corresponding application. Removing user privileges to files while still retaining sufficient access to the file via particular applications may result in a much more secure computing environment as if a user's account is compromised, as an attacker is still limited to actions performed through the particular application on the file. Granular information related to what applications and how applications request access to a file also enables forensic analysis of how a file is typically used such that unusual means of accessing the file may be detected and prevented.

As used herein, an "application" may refer to any executable program code, such as a job, workload, service, task, script, and the like, and may be of any suitable format, such as a binary file, executable, installer package, image, and the like.

Figure 2:
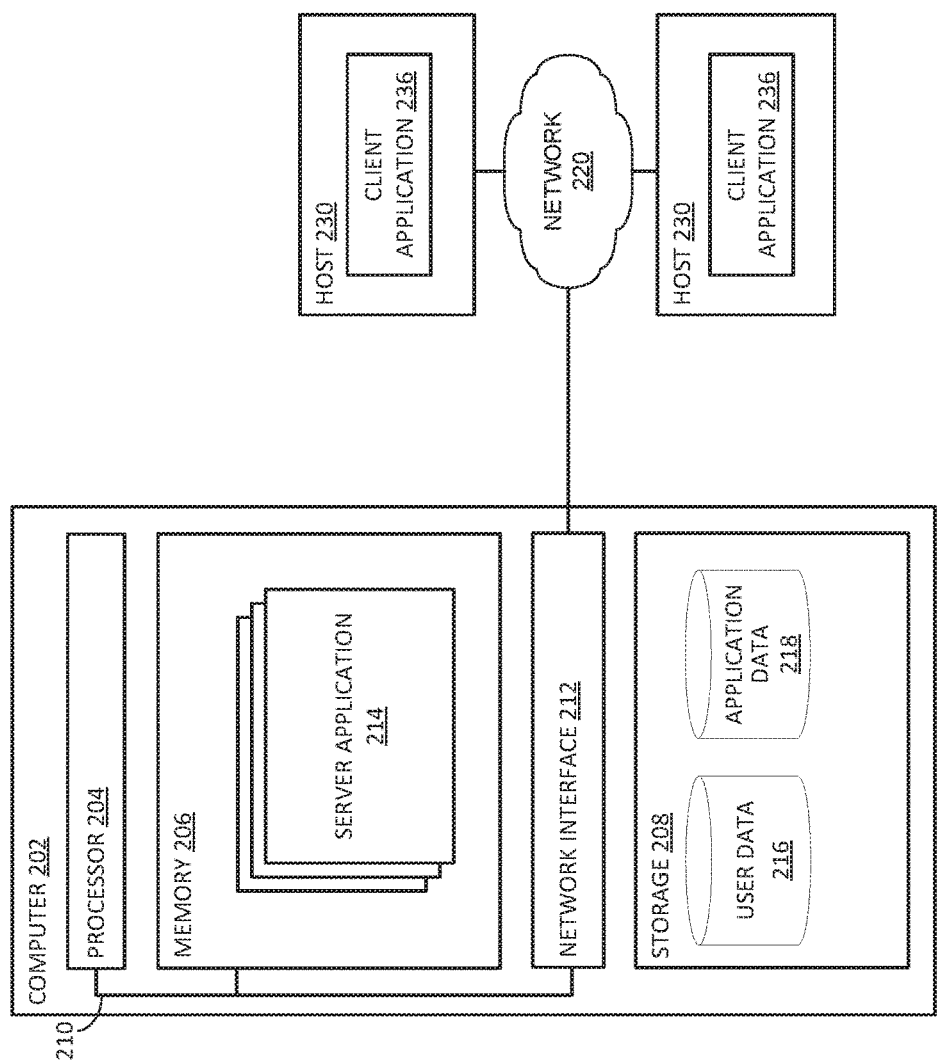
FIG. 2 illustrates a computing environment configured to enable an automated mechanism to secure customer data, according to aspects of the present disclosure.

FIG. 2 illustrates a computing environment 200 for an automated mechanism to secure customer data, according to aspects of the present disclosure. The computing environment 200 includes a computer 202. The computer 202 may also be connected to other computers (e.g. hosts) via a network 220.

The computer 202 generally includes a processor 204 which obtains instructions and data via a bus 210 from a memory 206 and/or storage 208. The computer 202 may also include one or more network interface devices 212 connected to the bus 110. The computer 202 is generally under the control of an operating system (not shown). Examples of operating systems include the IBM i operating system, UNIX operating system, the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The processor may execute one or more server applications 214 in memory 206. The network interface 212 may be any type of network communications device allowing the computer 202 to communicate with other computers via the network 220. The network interface 212 may exchange messages with the network 220.

The storage 208 is representative of hard-disk drives, solid state drives, flash memory devices, optical media, and the like. Storage 208 may also include structured storage, for example a database. Generally, the storage 208 stores user data 216 and application data 218 for use by the computer 202. In addition, the memory 206 and the storage 208 may be considered to include memory physically located elsewhere; for example, on another computer coupled to the computer 202 via the bus 210 or network 220.

According to aspects of the present disclosure, the computer 202 may be one or more servers operating as a part of a server cluster. For example, computer 202 may operate as an application server and may communicate with or in conjunction with other frontend, application, backend, data repository, or other type of server.

The hosts 230 are compute nodes configured to execute one or more client applications 236. Generally, client applications 236 may be deployed in any suitable configuration. For example, client applications 236 may execute on computer 202 as a process, or within the context of a virtual machine executing on computer 202. As another example, multiple client applications 236 may execute on a single compute node, separate from computer 202. As shown, client applications 236 execute on multiple hosts 230, which are separate from computer 202. The client applications 236 may communicate, via the network 220, with the server applications 214.

Figure 3:
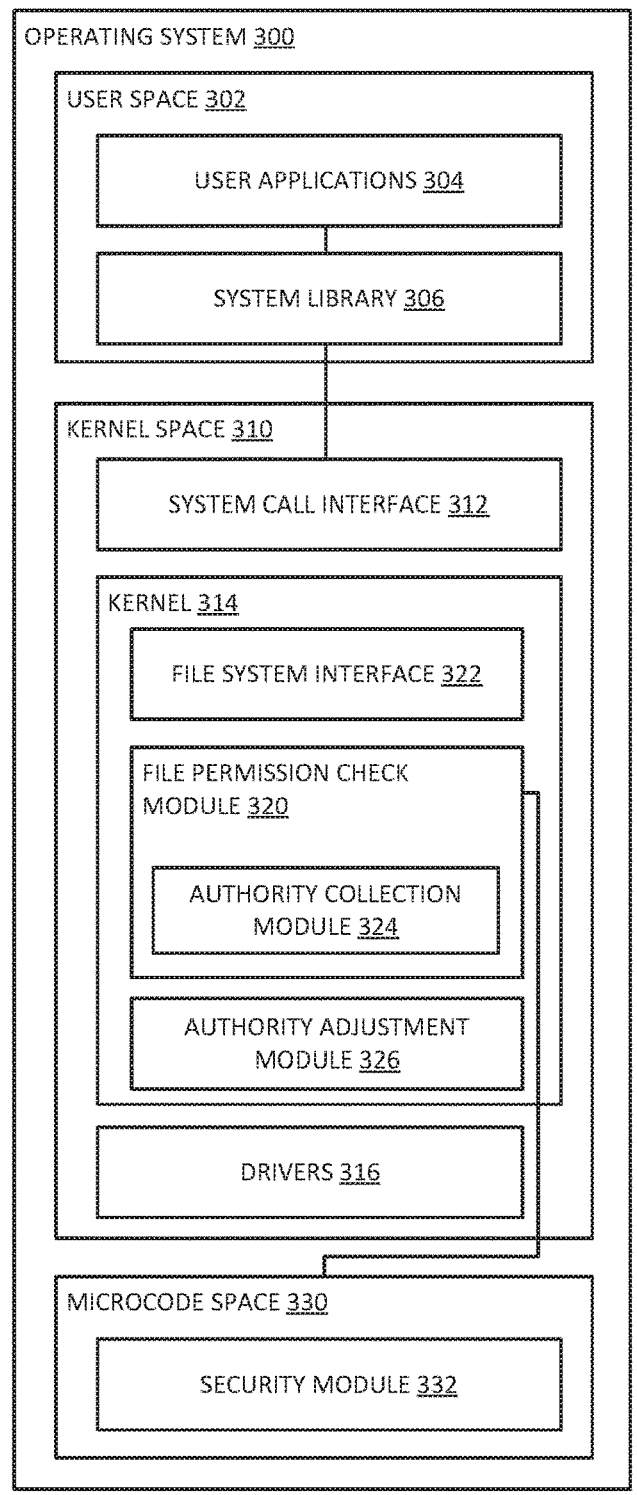
FIG. 3 is a diagram illustrating an example operating system according to aspects of the present disclosure.

FIG. 3 is a diagram illustrating an example operating system 300 according to aspects of the present disclosure. As discussed above, a computer is generally under the control of an operating system 300 which acts as an intermediary between computer hardware and provides a set of common services for software applications, including server and client applications. One of these common services often provided by modern operating systems include security services via file permissions. A software user application 304, such as a client or server application, may execute in a user space 302 of an operating system 300. The user application 304, executing in the context of a first user, may call into a system library 306, such as an application programming interface (API) or C library requesting access to one or more files. The system library 306 may then make a system call to a system call interface 312. The user application 304 may also directly make system calls to the system call interface 312. The system call interface 312, executing in kernel space 310, processes the system call.

Kernel space is a protected address space in memory in which core operating system operations, such as processing input/output (I/O) requests, managing memory, etc., are executed. Generally, kernel space is reserved for executing an operating system kernel 314, any installed kernel extensions (not shown) and device drivers 316. In contrast, user space 302 is address space in memory (separate from kernel space) used to execute applications 304, a graphical user interface (GUI), and system libraries 306. Each instance of a computer program executing in user space 302 is generally executed within its own virtual memory address space in the context of the user executing the program. Programs executing in user space 302 generally cannot access the virtual memory space of other programs without passing access requests through the kernel via the system library 306. Kernel programs executing in kernel space 310 generally have full memory access.

For example, in accessing a file, an application may invoke a system call, such as access( ) of the system library 306, passing in an indication of what type of access is sought, such as read or read/write access. The system library 306 then calls into the system call interface 312 executing in kernel space 310. The system call interface 312 may call into a file permissions check module 320 of the kernel 314 to determine whether the application has sufficient permissions to access the file. The file permissions check module 320 may base the permissions determination on, for example, the calling process' real authority based on the user authority, or the calling process' elevated authority, if available.

Generally, the kernel 314 manages access to I/O devices, including access to the file system and storage, as allowing direct application access to I/O device ports and controllers may cause system instabilities due to a misbehaving single application. As a part of managing access to the I/O device, the kernel 314 generally, determines whether to allow the application to perform file operations on the file based on the authority of the application, such as the user, group, or other authority, and the permissions on the file, and this determination may be made by the file permission check module 320 of the kernel 314. The file permissions check module 320 obtains the application's real or elevated authority and accesses file permissions information to perform functions necessary to verify that the application 304 has sufficient permissions to access the file.

The file permissions check module 320 obtains the application's real or elevated authority and accesses file permissions information to perform functions necessary to verify that the application 304 has sufficient permissions to access the file. For example, the file permissions check module 320 may interface with the file system interface 322 to access the file. The file system interface checks the file system and returns the file permissions. File permissions are stored with the file in a file system (e.g., new technology file system (NTFS), extended file system (ext, ext2-ext4), library based file system, database based file systems). For example, Unix style file permissions may be stored as 9 bits of information along with the file indicating which three actions (read, write, and execute) may be performed by which three groups (user, group, other). The file permissions check module 320 interprets these information bits to determine permissions to the file. Additionally, the file system may support access control lists (ACL) which may support assigning actions to more than one user or group for each file. ACLs are also stored in the file system.

Generally, permissions for a file are checked whenever there is an action performed on the file. For example, if a file is opened for reading, the file permission check module 320 performs a check to verify the user has read permissions on the file. Where the user then performs an edit on the file the application may then open the file for read/write. If the file is then re-opened for read/write, even during the same application instance, the file permission check module 320 performs another check on the file permissions. Another permissions check may be performed when the file is actually being written tom such as during a save.

In checking the permissions on a file, the file permissions check module 320 obtains file permissions information. This information may be passed along to an authority collection module 324 invoked by, or contained within, the file permissions check module 320. This information may pertain to, for example, details of the permissions available to the user, along with permissions available to any groups or ACLs associated with the user, permissions obtained from an executable asserting elevated privileges, permissions required by the file, time information, system object information, whether an authority check is successful, and other such information useful for checking whether a user has sufficient permissions to access a file. As the authority collection module 324 may collect information related to each permissions check, the authority collection module may determine the permissions requested by an application, along with the permissions actually used by the application. The authority collections module 324 may be able to obtain an application's runtime stack, which may detail each active subroutine of a program as well as calls by the program to other programs and interfaces, such as API or system calls. This runtime stack information may be useful for determining information leading up to the file permissions check, including, but not limited to, whether an application or any other programs or interfaces called by the program invoked elevated authority, as well as providing information on how an application typically places requests for file access, elevated authority, or other processes which may result in a file permissions check.

The authority collection module 324 may be configured, for example via a command line command or a graphical user interface, to obtain and log information related to a file permissions check. This logging may be configurable. For example, the authority collection module 324 may be configured to log every request for a file permissions check as well as the results of the check for a particular user. In addition, other configurations may be supported, such as for multiple users, specific types of files, or based on specific file permissions sought. The logged information may be stored in a file of the file system, for example, as a data file or database file. Logging, via the authority collection module 324 may be performed over a period of time, observing the files access by users in the ordinary course of activities on the computer. This logged file may be accessible, like other files, by an administrator or user to view and analyze using other tools, such as a database view tool. After the logged file access and permissions information is collected by the authority collection module 324, the information may be analyzed by an authority adjustment module 326. After the period of time, which may be a predetermined or administratively configured, the logs produced by the authority collection module 324 may be analyzed to determine appropriate file permissions for monitored files by an authority adjustment module 326. The authority adjustment module may also adjust file permissions based on this analysis.

In some systems, a protected microcode space 330 may be provided, which may be physically separate from hardware used to store and execute the user and kernel spaces. For example, the microcode space 330 may execute on a service processor or processor subsystem that interfaces with and manages another processor or other portions of a processor. The microcode space 330 provides a protected memory and execution space separate from both the user space 302 and kernel space 310 which kernel programs may call into while performing certain functions. The file permissions check module 330 may call into, for example, a security module 332 executing in the microcode space 330 to gather the file permissions information. Generally, authority collection of the file permissions may be performed in the same context in which file permissions are obtained. Where file permissions information is obtained in microcode, authority collection and authority adjustment may be performed, at least in part, in microcode space 330. For example, interfaces for beginning and ending authority collection and logging may be implemented in the OS kernel or user space, while data collection itself may be performed in microcode space.

According to aspects of the present disclosure, operating system architecture and how an authority collection process is implemented influences the amount and type of information available for collection as file permission information may be treated as privileged information by an operating system. For example, an operating system may partition execution of programs executing in user space such that they cannot access information related to other programs, such as a request for a file, without cooperation between multiple programs. Where such cooperation is not available, such as between legacy or third party programs, requests for access to or from another program may be passed along to the OS itself. However, some OS's may not support user space programs obtaining information related to file access by another program without a certain level of corporation between the programs. File permissions information available to applications executing solely in user space thus may be much less detailed than can be obtained where the authority collection is integrated to some degree in the OS kernel.

The authority collection process may also be implemented, at least in part, within the context of the OS kernel. For example, debugging functionality built into the OS kernel may be utilized. However, utilizing built-in debugging functionality of an OS using an authority collection application executing in user space may introduce authority elevation issues and impact user permissions as well as limit the flexibility or data obtainable by the application based on the features of the existing debugging functionality. In another example, the authority collection process may be integrated with the OS and execute in kernel space allowing the authority collection process to access memory and applications utilized in the user space, for example to access an application's runtime stack, which may be a stack data structure that contains information related the active subroutines (e.g., calls) of a program for returning control from a first subroutine higher on the runtime stack to a second subroutine lower on the runtime stack after the first subroutine has finished executing.

According to aspects of the present disclosure, an automated mechanism to secure data may be implemented as an OS kernel and microcode based process which secures data by first collecting information related to how a file is used and permissions information related to the file. This information may then be analyzed to determine the minimal level of permissions necessary to utilize the file and then permissions to files may be adjusted based on the analysis. Permissions information may be collected, for example, by an authority collection module executing within the context of a file permissions check module for each file access request. Permission information collection may be performed over a period of time to monitor how applications access files and is used to obtain an understanding of how the files are used by a particular user.

FIG. 4 is a chart view of the file permissions check log 400, in accordance with aspects of the present disclosure. As shown, the file permissions check log 400, depicts a portion of information that may be collected and logged by the authority collection module 324 of FIG. 3 based on a request for access to several files and objects. The view is based on database query on the log and contains information related to multiple files and objects. Information related to a specific file may be identified and displayed by other database queries. Here, the file permissions check log includes columns of information pertaining user authority 402, timestamp of each file permissions check 404, system object placing the call 406, required privilege to access the file based on the request 408, current privileges 412, along with a more detailed view of the required authority 410, source of the authentication information 414, whether elevated authority is used 416, most recent program invoking the system call 418, representing the start of forensic program information from the runtime stack, most recent user program statement number 420 associated with the system call, name of a program invoking elevated authority 422, program with elevated privileges statement number associated with the system call 424, and the owner of the program having elevated privileges 426. As discussed above, information in the file permissions check log may be information obtained during a file permission check performed by the file permission check module 320, classifying and logging the information obtained. The file permissions check module 320 may also obtain information from a runtime stack when a file permission check is requested. The runtime stack, may contain information related to the active subroutines of the application, including names of any additional applications called, names of calling and called subroutines, statement numbers of calling and called subroutines, order in which applications are called, whether a particular called application invoked elevated authority, and other runtime execution environment information related to the application, similar to information that may be available to a debugging development environment. The authority collection module may parse the runtime stack, classifying and logging the information in the stack.

Figure 5:
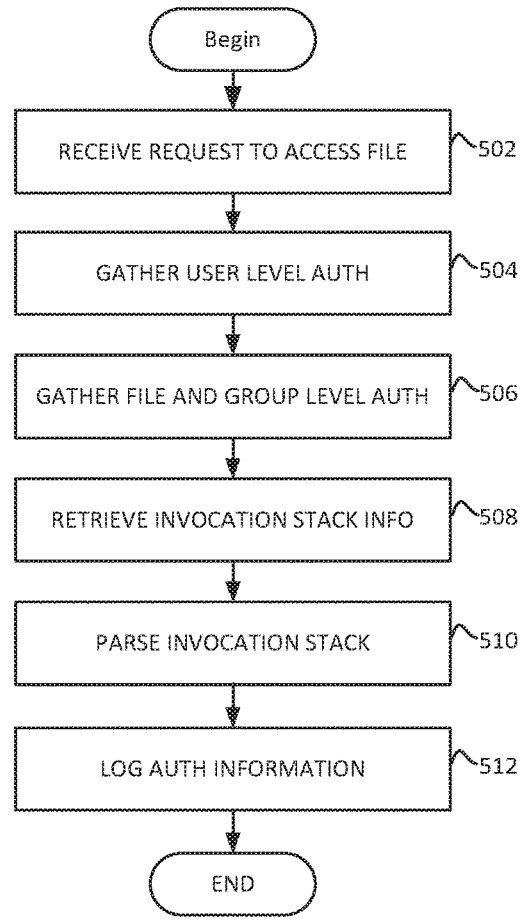
FIG. 5 is a flow chart illustrating a method for collecting authority information, in accordance with aspects of the present disclosure.

FIG. 5 is a flow chart illustrating a method 500 for collecting authority information, in accordance with aspects of the present disclosure. As shown, the method begins at step 502 when an application requests access to a file. In response, the authority collection module, via the file permissions check module, receives an indication of the identity of the file, the location of the file, the type of access requested (e.g., read/write/execute) along with user level identity information, such the process user and groups to which the process user is a member of. This user level identity information along with permissions associated with the identity may be gathered by the authority collection module at 504 for a particular file and file location. The file permissions check module may also obtain permissions information related to the file, such as the authority required by the system to access the file, users and groups current authority to the file, and ACL lists for the file. This file and group permissions information may be gathered by the authority collection module at 506 for a particular file and file location.

At 508, the authority collection module retrieves a runtime stack of the application requesting access to the file as well as information related to the runtime execution environment, such as job names, IDs, etc. Retrieving the runtime stack enables access to detailed information related the execution environment as well as information related to the application requesting access to the file. For example, the runtime stack may contain detailed information related to the runtime execution environment, such as information related to active calls made by the application, including names of any additional applications called, names of calling and called subroutines, statement numbers of calling and called subroutines, order in which applications are called, whether a particular called application invoked elevated authority, thread information, job information, and other runtime execution environment information related to the application. At 510, the authority collection module parses the runtime stack, identifying, for example, programs on the runtime stack, program statement numbers used invoked at each level of the runtime stack, system object call, job and thread information for the runtime environment. The parsing may, for example, be performed by looking at variable information passed into the system call, along with information related to returning to the subroutine when processing a particular call is finished, as well as environment information from a runtime context for the call.

The authority collection module may also determine whether elevated privileges were asserted and if so, what privileges those elevated privileges comprise. This determination may be based on, for example, the runtime stack, or by monitoring for privilege elevation requests. For example, the runtime stack may contain runtime execution environment information indicating what authority a particular application is invoking when the particular application makes a call to another application, a system call, or for each call. The authority collection module may gather identification information related to the executable asserting elevated privileges, including name and location of the executable, module, procedure name, and statement number within the executable requesting access to the file, and an indication as to whether the elevated privileges are used to access the file.

At 512, the gathered and parsed information is logged to an authority collection data file or OS control block for each file access request. This logging may be, for example, to a data file or to a database file.

Figure 6:
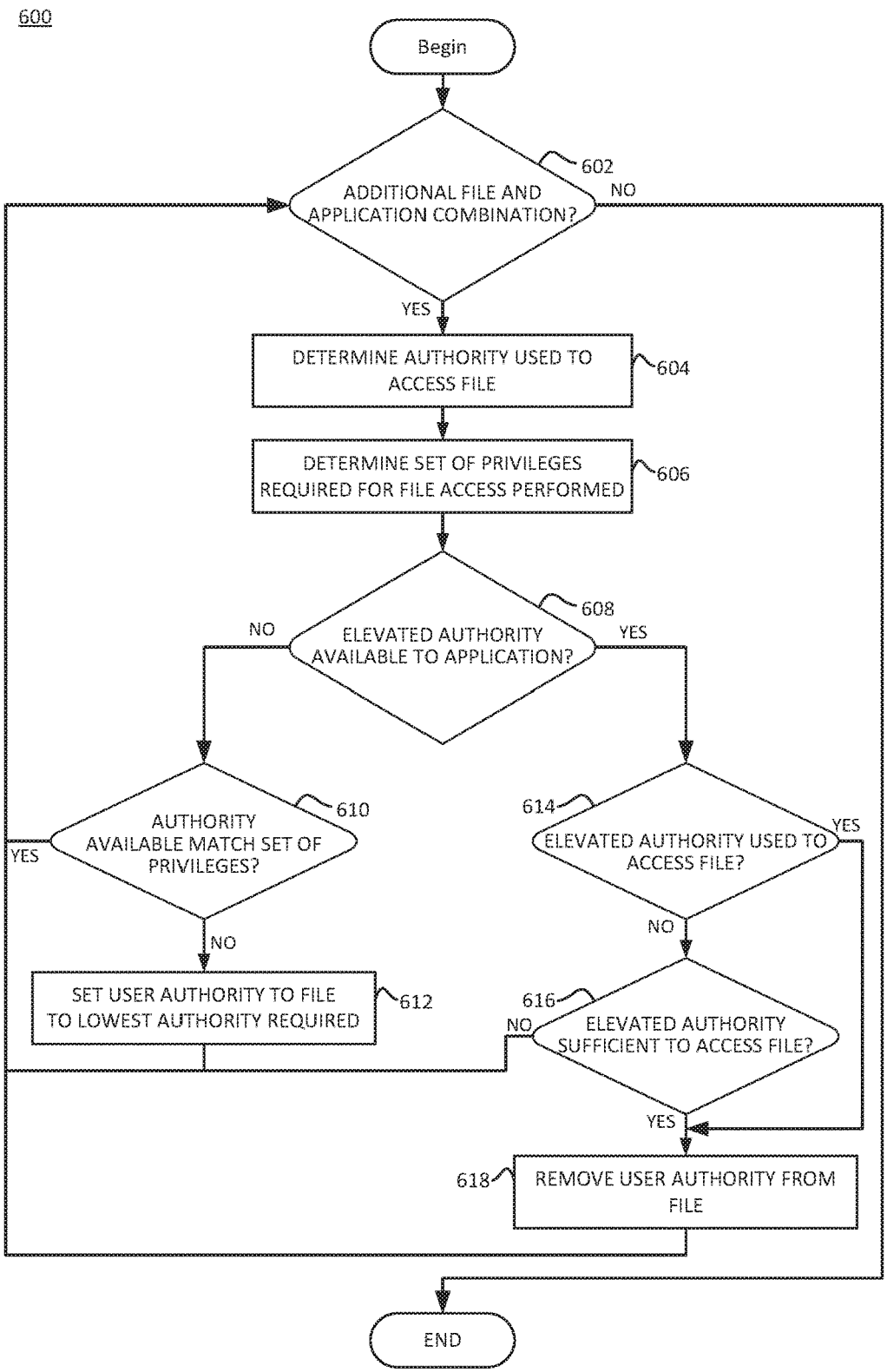
FIG. 6 is a flow chart illustrating a method for securing data, in accordance with aspects of the present disclosure.

FIG. 6 is a flow chart illustrating a method 600 for securing data, in accordance with aspects of the present disclosure. After file permission information is collected, file permissions may be adjusted on a file by file basis to better align user authority to access a file with available authority required to access the file. Permissions for each file accessed by a particular application and logged during authority collection may be analyzed for adjustment. The authority adjustment module, for example, may determine a user has more privileges than required to access a particular file by comparing the required privileges and the current privileges to see if the current privileges exceed the required privileges. As another example, the authority adjustment module may determine where privileges are elevated by an application, but not used. For example, a user running an application may have read/write privileges to a file in their user profile. The application also obtains elevated privileges for read/write access to the file. However, in accessing the file, the authority of the user is sufficient and there is no need to utilize the elevated privileges. As the user has read/write access to the file directly, the user is able to access the file for read/write both within the context of the application and also outside of the context of the application, such as via the command line, structure query language (SQL), file transfer protocol, or other interface.

At 602, information logged in the authority collection data file may be sorted and analyzed for every file accessed by the application, for applications in the log. At 604, based on the information logged, the authority used to access the file, as shown in column 402 of FIG. 4, is determined along with the source of the authority, for example, whether the authority is derived from the user authority, group authority, or particular ACL lists, as shown in column 414. At 606 the set of privileges required by the application to access the file as shown in columns 408 and 410, based on the requests actually made on the file, is determined. For example, where a file is opened first for read-only and then accessed again for read/write, the highest level of authority required to access the file is read/write access. At 608, a determination is made as to whether the application has elevated authority available to the application when accessing the file, for example based on column 422 or another column indicating an authority source.

Where authority elevation is not available to the application the privileges available to access the file are checked against the privileges required to access the file at 610.

Where the privileges are equal, processing of the file ends and the next file is processed at 602. Where the privileges available to access the file exceeds privileges required to access the file as requested by the application, the user authority on the file is adjusted to reduce the privileges to the minimum privileges required to access the file at 612. For example, if the user has read/write privileges to the file, but only ever accesses the file read only, then permissions on the file may be adjusted such that the user only has read only privileges to the file. Group and ACL authority may also be adjusted, but where there are multiple users in a group or ACL, permission information may be collected and analyzed for multiple users of the group or ACLs prior to adjusting permissions on the file.

If authority elevation is available to the application, a determination is made as to whether the elevated authority is used to access the file at 614, for example, based on column 416. At 618, if the elevated authority is used to access the file, user authority to the file may be removed. Group and ACL authority may also be adjusted where permission information is collected and analyzed for multiple users of the group or ACL prior to adjusting permissions on the file. As the application is utilizing elevated authority to access the file already, user authority to the file may be safely removed while still permitting the user to access the file in the context of the application, but unable to access the file outside of the application. If elevated authority is available, but not used to access the file, the privileges of the elevated authority is checked against the privileges required to access the file as requested by the application at 616. If the privileges of the elevated authority are insufficient to access the file, then processing of the file ends and the next file is processed at 602. If the privileges of the elevated authority are sufficient to access the file, then user authority to the file may be removed at 618. Group and ACL authority may be adjusted in a manner similar to that described above.

Figure 7:
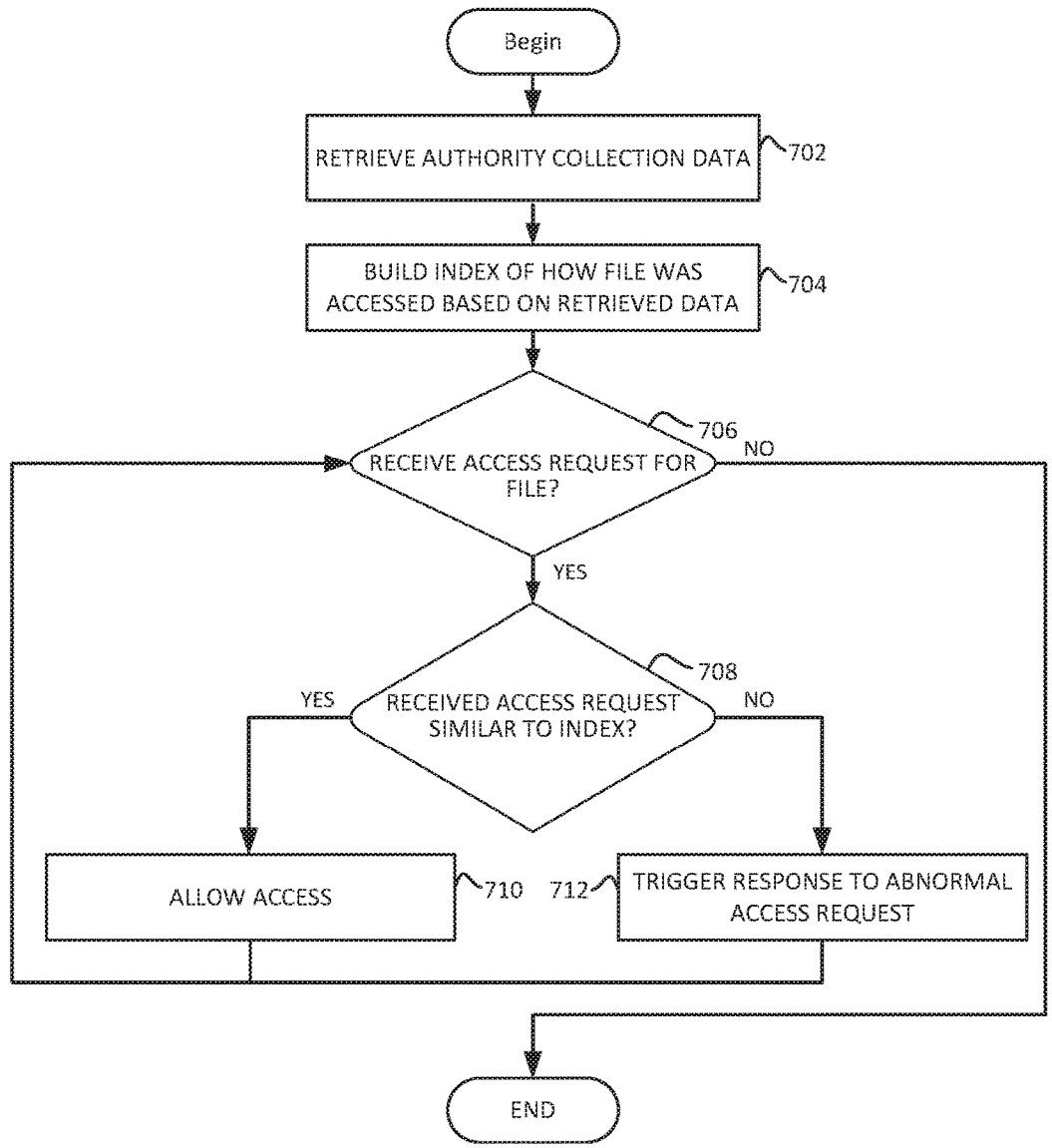
FIG. 7 is a flow chart illustrating a method for forensic analysis of a file request, in accordance with aspects of the present disclosure.

FIG. 7 is a flow chart illustrating a method 700 for forensic analysis of a file request, in accordance with aspects of the present disclosure. Forensic analysis for a file may be performed on the file when an application requests access to the file. In collecting authority information, detailed forensic information may be captured by retrieving the runtime stack of the application. As discussed above, during permissions information collection when the application requests access to the file the runtime stack for the requesting process may be captured. The most recent user space application may be located on the runtime stack. The name and location of the application may be captured, along with information, for example, indicating the procedure, module, or statement number making the request. This information may be stored and used to build an index or map of how a file is normally accessed by a user via various applications, for example, associating calls to certain system objects with specific program statement numbers, module names, and invoking program. Once this index is built, additional requests for the file may be monitored and compared against the index to detect abnormal behavior in how the file is accessed. At 702, the authority collection data file may be retrieved.

At 704, an index of how the file is access may be built based on the retrieved authority collection data file. For example, the index may contain an entry for each file accessed. Associated with each file may be the application and runtime stack information of the calls made by the application in requesting file access, along with the authority information. For example, a first user may typically access a file using a first set of applications, such as PROGRAM1 and PROGRAM2 from column 418 via statements 12 and 11, and requiring use privileges, respectively. The index may contain entries for the file indicating the above information. At 706, an access request for the file is received. For example, an application may make a system call that requires a request access to a file. When the request to access the file is received by the file permissions check module, the authority collection module may be invoked and a runtime stack of the application captured. This runtime stack is parsed to extract runtime environment information, and more specifically, runtime environment information related to the state of the application leading up to the system call, such as specific program statement numbers, module names, and invoking programs. This information is then compared to the existing index at 708 determine whether the access request is similar to any entries in the index. For example, where the user attempts to access the file using another application such as PROGRAM3, the authority collection module may determine the request to be abnormal based on a comparison of the request and entries in the index. In another example, where the user attempts to access the file using an application, such as PROGRAM1 that is in the index, but via a statement number different from ones in the index, the request may also be determined to be abnormal. At 710, where the request corresponds to an entry in the index, the file access request is allowed and proceeds normally.

When a request is determined to be abnormal, at 712, a response to the abnormal behavior is triggered. Multiple responses may be triggered and the exact response may be administratively configured by a user. For example, the file access request may be logged for later display to an administrator, the file access request denied even though sufficient authority is available, or an alert may be raised. The specific response may be based on how similar the file access request is as compared to the index. Returning to the previous example, where the file access request is from an application in the index, such as PROGRAM1, but via a different statement number, the file access request may be logged, whereas a file access request received from PROGRAM3, which has no corresponding entry in the index, may be blocked.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
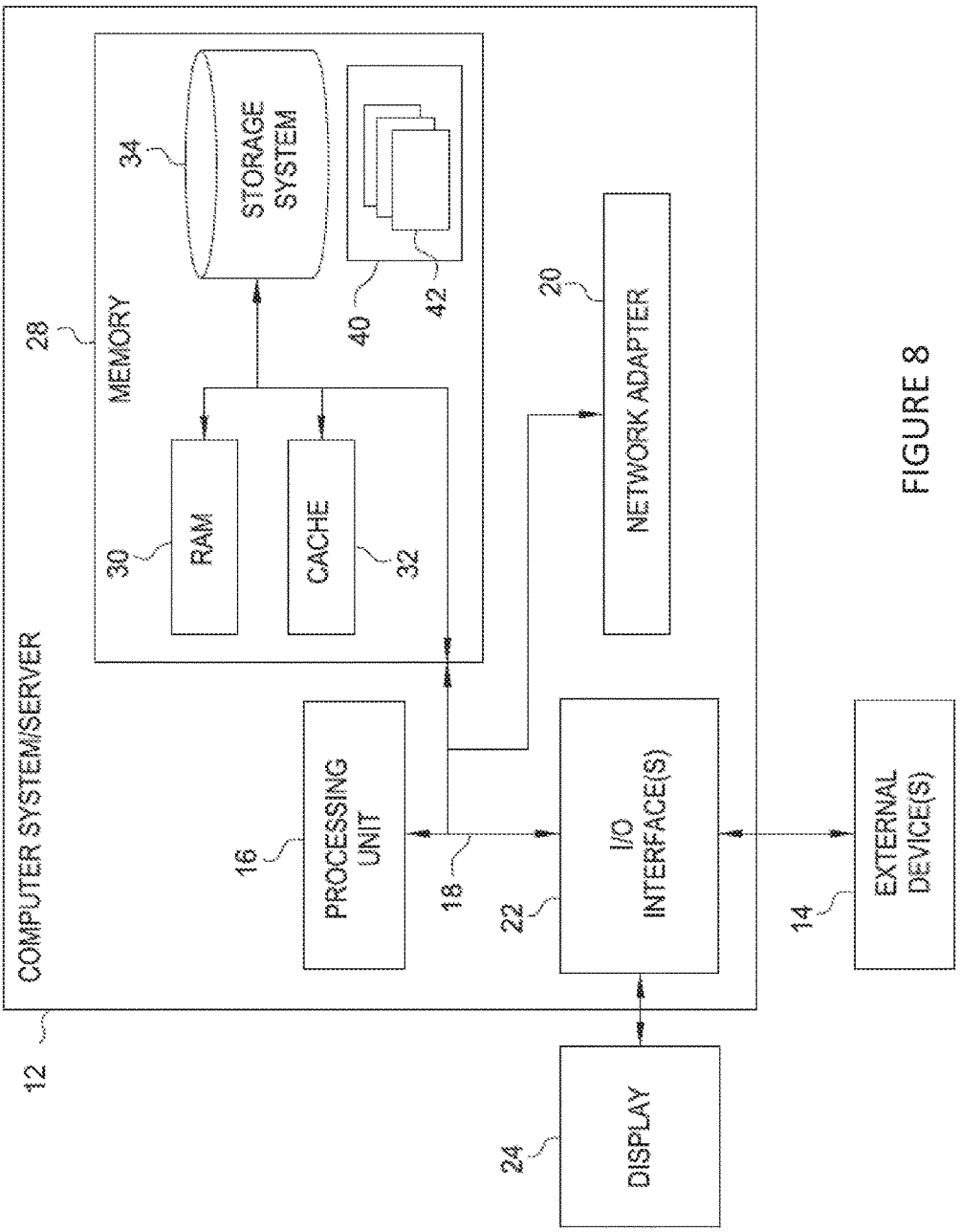
FIG. 8 depicts a cloud computing node according to one embodiment.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
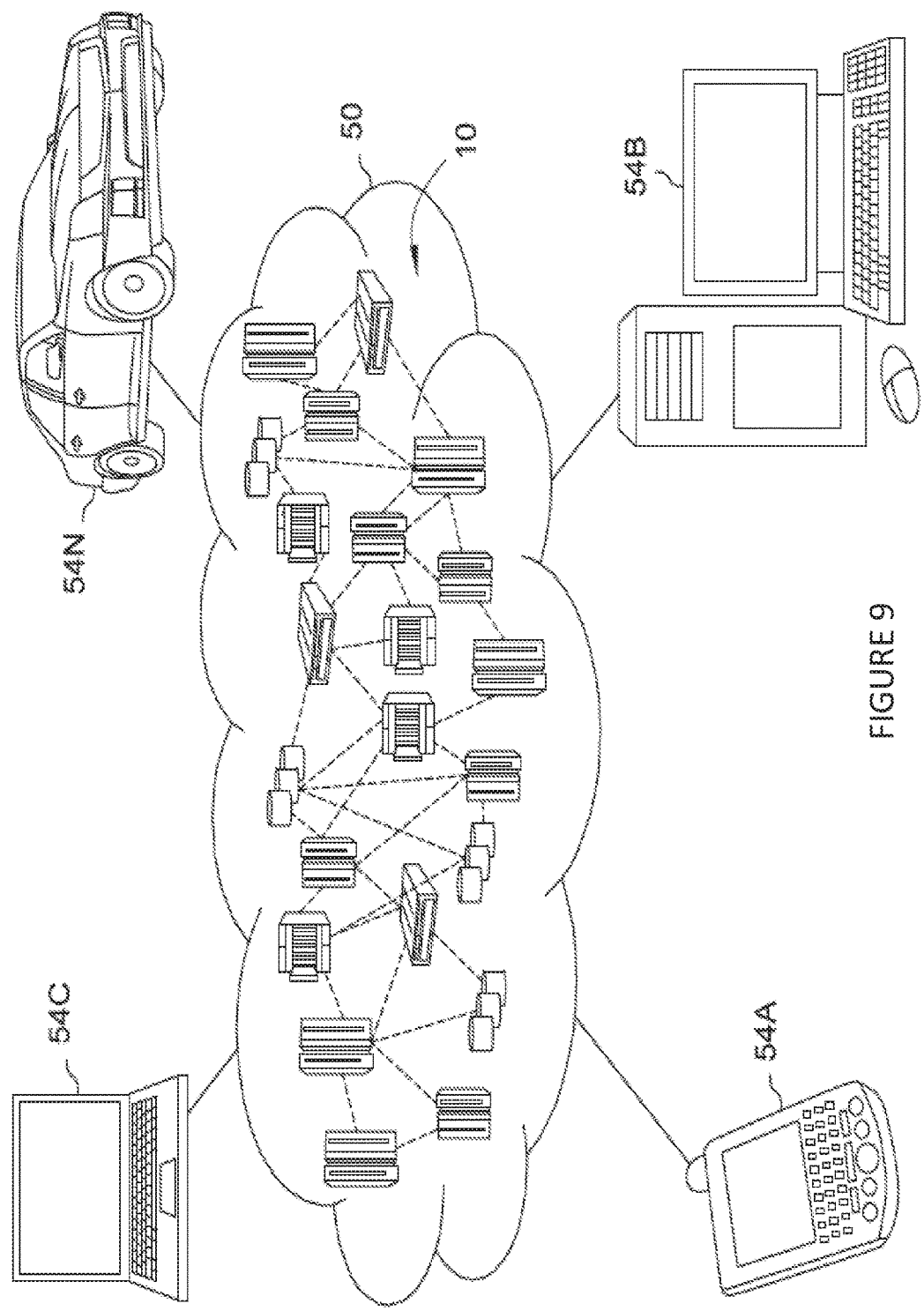
FIG. 9 depicts a cloud computing environment according to one embodiment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
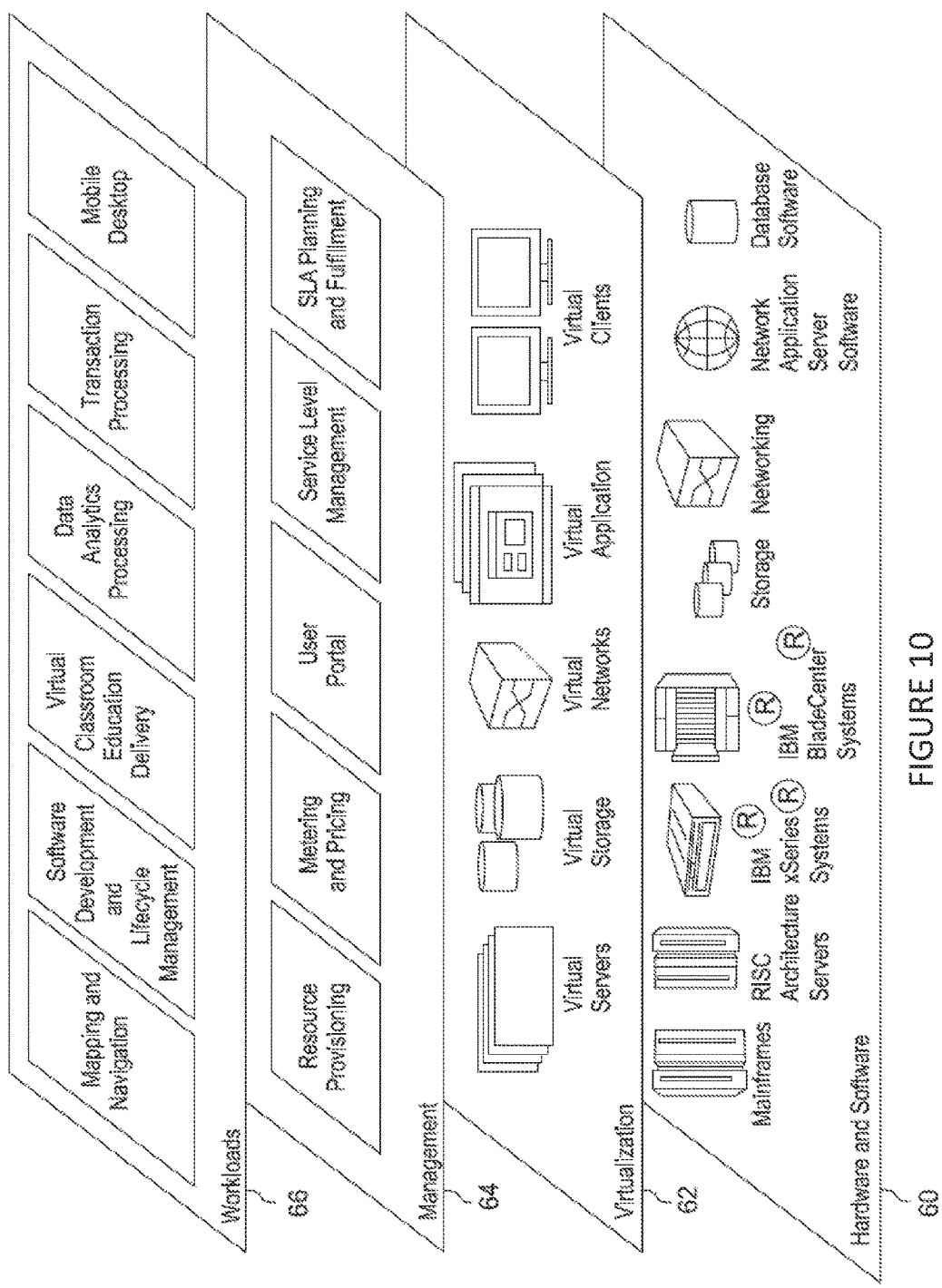
FIG. 10 depicts abstraction model layers according to one embodiment.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. The resource provisioning may be based on an analysis of the requested job/application and the cloud computing environment itself, as described above. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for an operating system kernel to secure file access by automatically identifying and removing non-essential privileges to files, the computer-implemented method comprising, by operation of one or more computer processors:
    monitoring, by the operating system kernel, a set of file access requests to a file from a first application to obtain permission, identity, and call information related to the monitored requests, wherein monitoring the set of file access requests includes obtaining a runtime stack from the first application based on a predefined call selected from a system object call and a microcode call, wherein the runtime stack has associated environment information specifying: (i) the system object call; (ii) programs on the runtime stack; (iii) program statement numbers of calling and called subroutines; (iv) names of calling and called subroutines; (v) an order in which applications are called; (vi) whether each called application invoked any owner privileges; (vii) thread and job information pertaining to the first application; and (viii) a runtime context of the first application;
    determining a set of user privileges available to a user, wherein the set of user privileges is available to the first application when the user causes execution of the first application, the first application having an owner other than the user;
    determining a set of owner privileges of the owner and available to the user only for conditional use as a fallback when the set of user privileges is insufficient for accessing the file when executing the first application, wherein the fallback is greater, lesser, or equal in scope relative to the set of user privileges;
    upon determining, by the operating system kernel, that the fallback is not used to access the file because the set of user privileges is sufficient to access the file and that the fallback is also sufficient to access the file, causing the fallback to be used in subsequently accessing the file, by automatically removing, from the set of user privileges, at least one existing user privilege to the file as being non-essential;
    wherein the operating system kernel is configured such that:
        upon a determination that the fallback is not used to access the file because the set of user privileges is sufficient to access the file and that the fallback is actually insufficient to access the file, at least one existing user privilege to the file is preserved in the set of user privileges, as being essential; and
        upon a determination that the fallback is used to access the file because the set of user privileges is insufficient to access the file, one or more existing user privileges to the file are removed altogether from the set of user privileges, as being non-essential; storing the call information as first call information in the data file;
    receiving, from a second application different from the first application, a request for access to the file;
    obtaining second call information from a runtime stack from the second application;
    determining the request for access is an abnormal request, based on comparing the first and second call information, wherein the comparing is based on at least the programs on the runtime stack and the program statement numbers of the calls, wherein the determining the request is abnormal comprises determining that the second application has owner privileges that are elevated relative to the set of owner privileges of the first application; and
    upon determining that the request for access is an abnormal request, automatically taking a predefined action comprising: (i) logging information related to the abnormal request and (ii) denying the request for access.

2. The computer-implemented method of claim 1, wherein the determination is based on authentication environment information recorded on the runtime stack.

3. The computer-implemented method of claim 1, further comprising determining the set of owner privileges is sufficient to allow the first application to access the file for each file access request in the set of file access requests.

4. The computer-implemented method of claim 1, further comprising:
    determining, based on the environment information in the runtime stack, when the set of owner privileges is different from the set of user privileges;
        storing, in a data file, the permission and identity information, information related to the sets of owner and user privileges, and an indication of when the set of owner privileges is greater in scope than the set of user privileges;
    wherein the determination that the fallback is not used because the set of user privileges is used is made based on, in respective instances: (i) the set of user privileges being used and (ii) the set of owner privileges not being used; wherein whether the set of owner privileges is used is determined based on information in the runtime stack, wherein the at least one existing user privilege is removed without having received any request specifying to remove the at least one existing user privilege; wherein the computer-implemented method further comprises:

generating an indication that the at least one existing user privilege is automatically removed, whereafter the indication is output.

5. The computer-implemented method of claim 4, wherein the determination that the fallback is not used is based on authentication environment information recorded on the runtime stack, wherein the computer-implemented method further comprises determining that the fallback is sufficient to permit the first application to access the file for each file access request in the set of file access requests, wherein the computer-implemented still further comprises, in respective instances:
   (i) determining, based on the set of user privileges being used, that the fallback is not used to access the file because the set of user privileges is sufficient to access the file, wherein the at least one existing user privilege is removed from the user based on the determination and as being a non-essential privilege sufficient to access the file;
   (ii) determining, based on the set of owner privileges being used, that the fallback is used to access the file because the set of user privileges is insufficient to access the file, wherein the one or more existing user privileges are removed altogether from the user based on the determination and as being one or more non-essential privileges insufficient to access the file;
   wherein the runtime stack information is obtained based on, in respective instances: (i) the system object call into the operating system kernel and (ii) the microcode call.

6. The computer-implemented method of claim 5, further comprising, prior to determining whether the set of owner privileges is different from the set of user privileges, performing an operation to set privileges for the user, the operation comprising:
   determining a set of needed privileges needed by the first application to access the file based on the stored data file;
   automatically selecting privileges to assign to the user, based on the set of needed privileges and the set of owner privileges;
   assigning the automatically selected privileges to the user as existing privileges of the user;
   upon determining, based on the set of owner privileges being used, that the fallback used to access the file because the set of user privileges is insufficient to access the file, automatically removing all existing user privileges from the user as being non-essential; and
   upon determining (i), based on the set of owner privileges being used, that the fallback is not used to access the file the file because the set of user privileges is sufficient to access the file and (ii) the fallback includes the set of needed privileges, automatically removing all existing user privileges from the user as being non-essential;
   wherein the automatically selected privileges to assign to the user are derived from, in respective instances, a user authority, a group authority, and an access control list.

7. The computer-implemented method of claim 6, wherein the operating system kernel is of an operating system having user space, kernel space, and microcode space, the operating system having a plurality of modules including:
   (i) a file permission check module resident in the kernel space, the file permission check module including an authority collection module configured to determine the sets of elevated, user, and needed privileges;
   (ii) an authority adjustment module resident in the kernel space and configured to automatically adjust user privileges for the user; and
   (iii) a security module resident in the microcode space and configured to handle the microcode call in order to obtain the runtime stack;
   wherein the user space includes a system library and one or more user applications including the first application, wherein the user space provides a runtime environment in which the first application executes, wherein the runtime information pertains to the runtime environment, wherein the kernel space includes a kernel, a system call interface, and one or more drivers, wherein the kernel includes a file system interface for a file system, wherein the file system stores the file and permissions associated therewith.

8. The computer-implemented method of claim 1, further comprising:
   determining, based on environment information in the runtime stack, whether the set of owner privileges is different from the set of user privileges.

9. The computer-implemented method of claim 1, further comprising:
   storing, in the data file: the permission, identity, and call information; information related to the sets of owner and user privileges; and an indication of whether the set of owner privileges is greater in scope than the set of user privileges.

10. A system to secure file access by automatically identifying and removing non-essential privileges to files, the system comprising:
   one or more computer processors;
   a memory containing a program comprising an operating system kernel which, when executed by the one or more computer processors, performs an operation comprising:
   monitoring, by the operating system kernel, a set of file access requests to a file from a first application to obtain permission, identity, and call information related to the monitored requests, wherein monitoring the set of file access requests includes obtaining a runtime stack from the first application based on a predefined call selected from a system object call and a microcode call, wherein the runtime stack has associated environment information specifying: (i) the system object call; (ii) programs on the runtime stack; (iii) program statement numbers of calling and called subroutines; (iv) names of calling and called subroutines; (v) an order in which applications are called; (vi) whether each called application invoked any owner privileges; (vii) thread and job information pertaining to the first application; and (viii) a runtime context of the first application;
   determining a set of user privileges available to a user, wherein the set of user privileges is available to the first application when the user causes execution of the first application, the first application having an owner other than the user;
   determining a set of owner privileges of the owner and available to the user only for conditional use as a fallback when the set of user privileges is insufficient for accessing the file when executing the first application, wherein the fallback is greater, lesser, or equal in scope relative to the set of user privileges; and
   upon determining, by the operating system kernel, that the fallback is not used to access the file because the set of user privileges is sufficient to access the file and that the fallback is also sufficient to access the file, causing the fallback to be used in subsequently accessing the file, by automatically removing, from the set of user privileges, at least one existing user privilege to the file as being non-essential;

wherein the operating system kernel is configured such that:

upon a determination that the fallback is not used to access the file because the set of user privileges is sufficient to access the file and that the fallback is actually insufficient to access the file, at least one existing user privilege to the file is preserved in the set of user privileges, as being essential; and upon a determination that the fallback is used to access the file because the set of user privileges is insufficient to access the file, one or more existing users privilege to the file are removed altogether from the set of user privileges, as being non-essential;

storing the call information as first call information in the data file;

receiving, from a second application different from the first application, a request for access to the file;

obtaining second call information from a runtime stack from the second application;

determining the request for access is an abnormal request, based on comparing the first and second call information, wherein the comparing is based on at least the programs on the runtime stack and the program statement numbers of the calls, wherein the determining the request is abnormal comprises determining that the second application has owner privileges that are elevated relative to the set of owner privileges of the first application; and upon determining that the request for access is an abnormal request, automatically taking a predefined action comprising: (i) logging information related to the abnormal request and (ii) denying the request for access.

11. The system of claim 10, wherein the determination is based on authentication environment information recorded on the runtime stack.

12. The system of claim 10, wherein the operation further comprises determining the set of owner privileges is sufficient to allow the first application to access the file for each file access request in the set of file access requests.

13. The system of claim 10, wherein the operation further comprises:

determining, based on environment information in the runtime stack, whether the set of owner privileges is different from the set of user privileges.

14. The system of claim 10, wherein the operation further comprises:

storing, in the data file: the permission, identity, and call information; information related to the sets of owner and user privileges; and an indication of whether the set of owner privileges is greater in scope than the set of user privileges.

15. A computer program product for securing file access by automatically identifying and removing non-essential privileges to files, the computer program product comprising:

a computer readable storage medium having embodied therewith computer-readable program code of an operating system kernel, the computer-readable program code executable by one or more computer processors to perform an operation comprising:

monitoring, by the operating system kernel, a set of file access requests to a file from a first application to obtain permission, identity, and call information related to the monitored requests, wherein monitoring the set of file access requests includes obtaining a runtime stack from the first application based on a predefined call selected from a system object call and a microcode call, wherein the runtime stack has associated environment information specifying: (i) the system object call; (ii) programs on the runtime stack; (iii) program statement numbers of calling and called subroutines; (iv) names of calling and called subroutines; (v) an order in which applications are called; (vi) whether each called application invoked any owner privileges; (vii) thread and job information pertaining to the first application; and (viii) a runtime context of the first application;

determining a set of user privileges available to a user, wherein the set of user privileges is available to the first application when the user causes execution of the first application, the first application having an owner other than the user;

determining a set of owner privileges of the owner and available to the user only for conditional use as a fallback when the set of user privileges is insufficient for accessing the file when executing the first application, wherein the fallback is greater, lesser, or equal in scope relative to the set of user privileges; and upon determining, by the operating system kernel, that the fallback is not used to access the file because the set of user privileges is sufficient to access the file and that the fallback is also sufficient to access the file, causing the fallback to be used in subsequently accessing the file, by automatically removing, from the set of user privileges, at least one existing user privilege to the file as being non-essential;

wherein the operating system kernel is configured such that:

upon a determination that the fallback is not used to access the file because the set of user privileges is sufficient to access the file and that the fallback is actually insufficient to access the file, at least one existing user privilege to the file is preserved in the set of user privileges, as being essential; and upon a determination that the fallback is used to access the file because the set of user privileges is insufficient to access the file, one or more existing user privileges to the file are removed altogether from the set of user privileges, as being non-essential;

storing the call information as first call information in the data file;

receiving, from a second application different from the first application, a request for access to the file;

obtaining second call information from a runtime stack from the second application;

determining the request for access is an abnormal request, based on comparing the first and second call information, wherein the comparing is based on at least the programs on the runtime stack and the program statement numbers of the calls, wherein the determining the request is abnormal comprises determining that the second application has owner privileges that are elevated relative to the set of owner privileges of the first application; and upon determining that the request for access is an abnormal request, automatically taking a predefined action comprising: (i) logging information related to the abnormal request and (ii) denying the request for access.

16. The computer program product of claim 15, wherein the determination is based on authentication environment information recorded on the runtime stack.

17. The computer program product of claim 15, wherein the operation further comprises determining the set of owner privileges is sufficient to allow the first application to access the file for each file access request in the set of file access requests.

18. The computer program product of claim 15, wherein the operation further comprises:
   determining, based on environment information in the runtime stack, whether the set of owner privileges is different from the set of user privileges.

19. The computer program product of claim 15, wherein the operation further comprises:
   storing, in the data file: the permission, identity, and call information; information related to the sets of owner and user privileges; and an indication of whether the set of owner privileges is greater in scope than the set of user privileges.

20. The computer program product of claim 15, wherein the operation further comprises:
   storing, in the data file, and an indication of whether the set of owner privileges is greater in scope than the set of user privileges.

* * * * *